Sept. 7, 1965   P. M. ERLANDSON   3,205,094
ELECTRICAL WEAKENING OF STRIPS, APPARATUS, AND ARTICLES
Filed Oct. 12, 1960   2 Sheets-Sheet 1
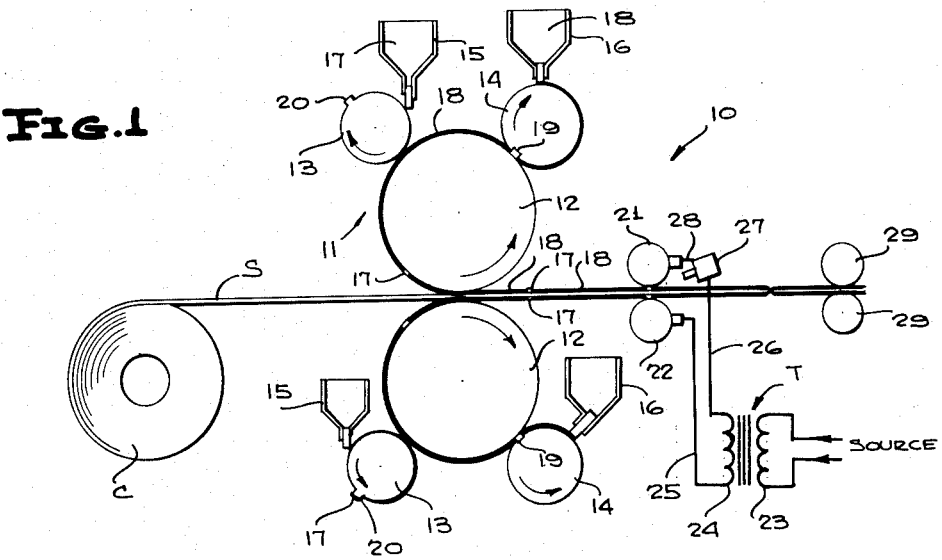
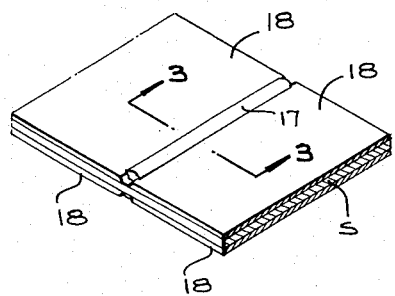
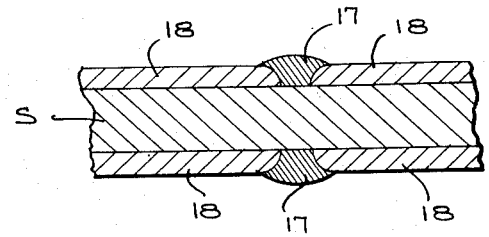
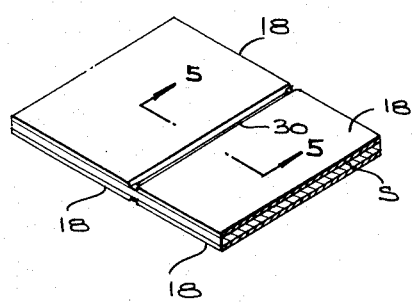
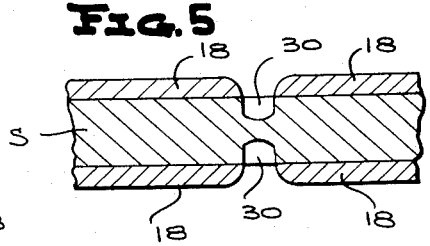
INVENTOR.
PAUL M. ERLANDSON
BY
ATTORNEYS Sept. 7, 1965  P. M. ERLANDSON  3,205,094
ELECTRICAL WEAKENING OF STRIPS, APPARATUS, AND ARTICLES
Filed Oct. 12, 1960  2 Sheets-Sheet 2
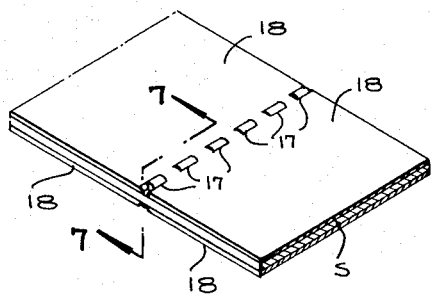
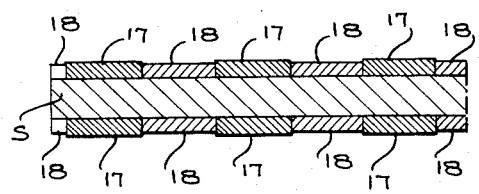
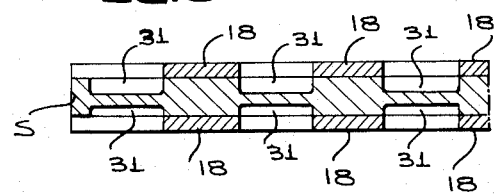
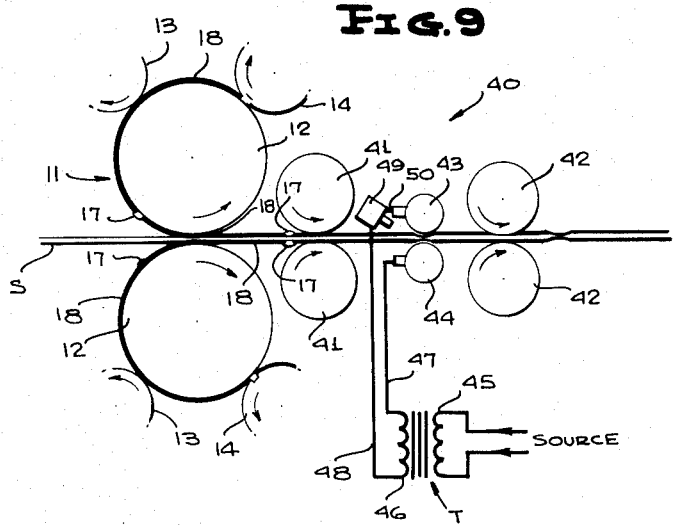
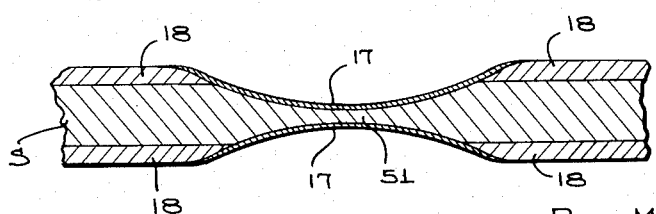
INVENTOR.
PAUL M. ERLANDSON
BY
Mason, Porter, Diller & Stewart
ATTORNEYS

United States Patent Office 3,205,094
Patented Sept. 7, 1965

3,205,094
ELECTRICAL WEAKENING OF STRIPS, APPARATUS, AND ARTICLES
Paul M. Erlandson, New Canaan, Conn., assignor to Continental Can Company, Inc., New York, N.Y., a corporation of New York
Filed Oct. 12, 1960, Ser. No. 62,252
16 Claims. (Cl. 117—212)

This invention relates in general to new and useful improvements in the art of making can bodies, and more specifically to a novel method and apparatus for transversely weakening a metal strip at can body length intervals, and the strip so formed.

For many years, it has been proposed to make can bodies by first forming an elongated strip into a tube through a shaping and seam welding operation, after which the tube is cut off at can body intervals. In order to facilitate the separation of the can bodies, it has also been proposed to weaken the strip in advance of the shaping and welding operation. While this procedure has proved to be a desirable one, numerous problems have arisen when it is desired to decorate the can body. At the present time, it is very expensive to decorate the completed can body as opposed to decorating the can body in its blank or flat form. It is therefore desirable to decorate the strip prior to the forming thereof into its tubular shape. This may be readily done with known printing equipment. However, the problem of synchronizing the scoring mechanism with the printing mechanism has been an insurmountable one. While the scoring may be accurately done, when the strip has hundreds of can body designs printed thereon, any minor error in the scoring operation is greatly multiplied, with the result that the scoring soon becomes out of phase with the application of the decoration. This, of course, is not permissible.

In accordance with this invention, it is proposed to simultaneously decorate a metal strip and to apply lines of electrical conductive coating on the strip between each decorated area, whereby through the use of an electrical heating and/or burning operation, the strip may be weakened along the lines of electrical conductive coating so that the weakening of the strip remains in phase with the decorating thereof at all times.

Another object of the invention is to provide a novel method of decorating a metal strip to be used in the forming of can bodies and the like and weakening the metal strip in synchronism with the application of the decoration thereon so that the strip is weakened between adjacent decorations, the method including the application of coatings on at least one surface of the strip, with the coatings including enlarged areas of a decorative nature, and the coating material being in the form of an electrical insulator, and the other coating being in the form of narrow lines extending transversely of the strip between adjacent decorated areas, this latter coating material having electrical conductive properties, and the coated strip being passed between a pair of electrodes wherein current is caused to flow through the narrow lines of coating and through the metal strip to effect the heating and/or burning of the strip to so weaken the strip.

Another object of the invention is to provide a novel apparatus for decorating a metal strip to be used in the forming of can bodies and weakening the metal strip intermediate the decorations thereon, the apparatus including a suitable printing mechanism for printing the required decorative coating, which coating has electrical insulating properties, and narrow lines of coating extending transversely of the strip between adjacent decorative coatings, the narrow lines of coating having electrical conductive properties, and means for feeding the coated strip between a pair of electrodes and supplying electrical energy to the electrodes for passage through the metal strip in alignment with the narrow lines of coating to effect the heating and/or burning of the metal of the strip to so weaken the strip.

Another object of the invention is to provide a coated strip for use in the forming of can bodies and the like, wherein the strip is shaped into tubular form, welded and then broken off at can body length intervals, the strip having at least one side thereof coated and the coating including large decorative areas wherein the coating material has electrical insulating properties, and narrow line areas extending transversely of the strip between the decorative areas, the coating material of the narrow line areas having electrical conductive properties whereby, when the strip is passed between a pair of electrodes, current will be caused to flow through only those areas of the strip coated with the coating having electrical conductive properties and the heating and resultant weakening of the strip will take place at only narrow line locations intermediate the decorative areas of the strip.

A still further object of the invention is to provide a weakened metal strip for use in the forming of can bodies, the metal strip having a decorative coating on at least one surface thereof, and the areas of decorative coating being separated by transverse weakening lines which have been accomplished through the electrical heating and/or burning of the metal of the strip.

Still another object of the invention is to provide a novel method of weakening metal strips for use in the forming of can bodies, the metal strips having at least one surface thereof provided with a coating which includes large decorative areas having a coating with electrical insulating properties and narrow line coatings intermediate the decorative areas wherein the narrow line coatings have electrical conductive properties so that electricity may be caused to flow through the metal strip only intermediate the decorative areas so as to weaken the strip through the electrical heating thereof, the coating of the narrow line areas having a lesser resistivity than the base metal, to minimize heating within the coating and emphasize heating of the base metal.

Another object of the invention is to provide a novel method of transversely weakening a metal strip for use in the forming of can bodies, the method including the application of a coating to at least one surface of the strip wherein the coating includes large areas coated with a material having electrical insulating properties separated by narrow line areas extending transversely of the strip and coated with a material having electrical conductive properties, and passing the coated strip between a pair of electrodes while tensioning the strip, whereby current will flow between the electrodes through the coating material having electrical conductive properties and the metal of the strip so as to heat and momentarily weaken the strip, at which time the strip, due to the tensile stresses placed thereupon, will be partially pulled apart and necked down to define transversely extending weakened areas along which can bodies may be broken after the strip has been shaped and welded into a tubular form.

With the above, and other objects in view that will hereinafter appear, the nature of the invention will be more clearly understood by reference to the following detailed description, the appended claims, and the several views illustrated in the accompanying drawings.

In the drawings:

FIGURE 1 is a schematic view of an apparatus for effecting the coating of a metal strip and the burning away of portions of the metal strip along transverse lines to effect the weakening thereof at predetermined spaced intervals.

FIGURE 2 is an enlarged fragmentary schematic view showing the coated strip prior to the weakening thereof.

FIGURE 3 is an enlarged fragmentary sectional view, taken along the section line 3—3 of FIGURE 2, and shows the specific cross-section of the coated strip transversely of the intended weakening line.

FIGURE 4 is an enlarged schematic perspective view similar to FIGURE 2, and shows the coated strip subsequent to the weakening thereof.

FIGURE 5 is an enlarged fragmentary vertical sectional view, similar to FIGURE 3, and shows the weakened coated strip.

FIGURE 6 is an enlarged schematic perspective view similar to FIGURE 2, and shows another coated strip having a modified form of coating thereon.

FIGURE 7 is an enlarged fragmentary vertical sectional view through the strip of FIGURE 6, taken along the section line 7—7 of FIGURE 6, and shows the alternating coating of the strip.

FIGURE 8 is an enlarged sectional view similar to FIGURE 7, and shows the coated strip of FIGURE 7 after the weakening thereof.

FIGURE 9 is a schematic view showing another apparatus for weakening the metal strip, this apparatus effecting the weakening of the strip by electrically heating the strip and simultaneously tensioning the strip so as to the pull and neck down the heated weakened portion of the strip.

FIGURE 10 is an enlarged fragmentary schematic sectional view taken through a weakened zone of the strip, and shows the details thereof.

A first apparatus for coating and electrically weakening metal strip in accordance with this invention is illustrated in FIGURE 1 and generally referred to by the numeral 10. The apparatus 10 is employed in conjunction with a metal strip S which is supplied in the form of a coil C. The strip S is preferably of a width equal to the circumference of the intended can body to be formed from the strip S, although the width of the strip S may be unit multiples of can body circumferences. When the strip S is to be used in the forming of can bodies, it will be formed of a low carbon steel, such as that normally used in the forming of can bodies, although other base metals, such as aluminum, alloys and various metal coated metal substrates may be employed. Also, the thickness of the metal strip will normally be between 0.004 inch and 0.015 inch, although the invention is not so restricted.

The strip S first passes through a printing apparatus, generally referred to by the numeral 11. The printing apparatus 11 is generally duplicated above and below the strip S, and includes a pair of opposed printing rolls 12 which engage opposite surfaces of the strip S and apply suitable coatings thereon. Each of the printing rolls 12 has associated therewith a pair of coating rolls 13 and 14. The coating roll 13 has associated therewith a coating reservoir 15 and the coating roll 14 has associated therewith a coating reservoir 16. Each of the coating reservoirs 15 has a first coating material 17 disposed therein. On the other hand, each of the coating reservoirs 16 has a second coating material 18 disposed therein. The coating material 17 has electrical conductive properties, whereas the coating material 18 has electrical insulating properties.

As the printing rolls 12 rotate, they receive from the rolls 13, 14 coating materials 17, 18 and such coating material is transferred to the opposed surfaces of the strip S. It is to be noted that the rolls 14 are interrupted, as at 19, in the form of recesses extending longitudinally thereof. Thus, this portion of each of the rolls 14 receives no coating material from the coating reservoir 16 and the application of the coating 18 to the printing rolls 12 is discontinuous. On the other hand, the rolls 13 have projecting portions 20 which are the only portions thereof receiving coating material 17 from the coating reservoir 15. The rotation of the rolls 13 and 14 is in timed relation, so that the coating material 17 is applied to the areas of the printing rolls 12 free of the coating 18. Thus, when the coating materials 17, 18 are applied to the opposite surfaces of the strip S, the coating material 18 is applied to relatively large areas of the strip S, with the large areas of the coating material 18 being separated by narrow line areas of the coating material 17, the line areas of the coating material 17 extending transversely of the strip S.

When the strip S is intended for use in forming can bodies, the application of the coating material 17 will be at can body height intervals. Further, in many instances, the coating material 18 will be of a decorative nature on one surface of the strip S and may be of a multi-color design so as to provide exterior ornamentation for the finished can body. This, of course, will be applied to that surface of the strip S which will be disposed outermost in the forming of a tube. The coating material 18 applied to the surface of the strip S which will define the interior surface of a tube will preferably be in the form of a protective lacquer or the like.

As is best illustrated in FIGURE 2, it is preferred that the line of coating material 17 terminate adjacent to, but spaced from the edges of the strip S. In accordance with the invention, it is proposed to pass electrical current through the coating material 17 and to weaken that portion of the metal strip S underlying the coating material 17. In order to form the desired weld between the edges of the strip S when the strip S is of a tubular shape, it is desired that the edge portions be uninterrupted. Thus the termination of the coating material 17 short of the edges of the strip S will assure the termination of the weakening of the strip S short of the edges thereof.

Attention is now directed to FIGURE 3, wherein a cross-section of the coated strip S transversely of one of the lines of coating material 17 is illustrated. It is to be noted that the coating material 17 projects slightly above the coating material 18, the layer of coating material 17 being heavier than the layers of coating material 18. This is desired so that contact of the coating material 17 with electrodes is assured. At this time, it is also pointed out that the resistivity of the coating material 17 may be less than the resistivity of the base metal of the strip S to minimize heating in the conductive path formed by the conductive material 17 and to emphasize heating of the base metal of the strip S when electrical current is passed through the coating material 17 and the strip S.

After the coating material 17, 18 has been applied to the strip S, the coated strip S then passes between a pair of opposed electrodes 21, 22 which are preferably in the form of rollers so as to have rolling contact with the opposite faces of the coated strip S. The electrodes 21, 22 are part of an electrical system which includes a transformer T having a primary winding 23, which is connected to a power source, and a secondary winding 24. The secondary winding 24 has one end thereof connected to the electrode 22 by a wire 25. The opposite end of the secondary winding 24 may be directly connected to the electrode 21 by a wire 26, or, if desired, the wire 26 may be connected to a suitable control device 27 which pulses the flow of current to the electrodes 21, 22 in timed relation to the passage of the strip S between the electrodes 21, 22. When the control device 27 is utilized, another wire 28 connects the control device 27 to the electrode 21. The control device 27 may be of any suitable type, and is preferably in the form of a suitable conventional photoelectric registration type detector.

During the passage of the coated strip S between the electrodes 21, 22, as long as the coating material 18 is aligned with the electrodes 21, 22, there is no flow of current. However, when the electrodes 21, 22 come into engagement with the lines of coating material 17, which coating material has electrical conductive properties, a very short impulse of high current is triggered through the conductive coating material 17 and the metal base of the strip S either through such conduction or through the operation of the control device 27. When this impulse of high current is sufficiently short and powerful, erosion of the base metal of the strip S in alignment with the lines of coating material 17 will occur.

For illustrative purposes, the apparatus 10 as shown to include a pair of opposed feed rolls 29. These feed rolls may be of any type, and may be part of other equipment to be used in conjunction with the apparatus 10. It is merely necessary that the coated strip S be in motion with sufficient velocity that the eroded material may escape from between the electrodes 21, 22 after the material is heated.

As is best shown in FIGURE 4, after the strip S has passed through the apparatus 10, the opposite surfaces thereof have zones coated with the coating material 18, the zones being separated by weakening lines 30. The weakening lines 30 extend into the metal base of the strip S from opposite surfaces thereof, as is shown in FIGURE 5, and terminate short of the side edges of the strip S, the burning away of the metal of the strip S being limited to the areas coated by the coating material 17, which coating material terminated short of the edges of the strip S.

The weakened and coated strip S may now be passed into a suitable tube shaping and welding apparatus, after which it is separated along the weakening lines 30 into individual lengths, which lengths may be in the form of can bodies. At this time, it is pointed out that it is not necessary that opposite surfaces of the strip S be coated in order to obtain the desired eroding action. If desired, only one surface of the strip S need be coated.

Reference is now made to FIGURES 6, 7 and 8 wherein a modified form of coated strip is illustrated. The strip S, like the strip S in FIGURE 2, is provided with coating material 18 on opposite surfaces thereof. However, in lieu of the coating material 18 being discontinuous and separated by continuous lines of coating material 17, portions of the zones of coating material 18 are continuous, the coating material 18 being alternated with short lengths of lines of coating material 17 extending transversely across the strip S. It is to be noted that there is a short line of coating material 17 disposed adjacent to, but spaced from, each edge of the strip S. The next short lines of coating material 17 are spaced apart, with the area therebetween being filled by the coating material 18.

The coated strip of FIGURE 6 may be formed utilizing the apparatus 10 of FIGURE 1. However, the recesses 19 in the rolls 14 will have to be interrupted so that the recesses are relatively short in length and extend in spaced alignment longitudinally of their respective one of the rolls 14. On the other hand, the projections 20 on the rolls 13 must be discontinuous and matched with the relatively short recesses 19 of the rolls 14.

Reference is now made to FIGURE 8, wherein the coated strip of FIGURE 6 is illustrated subsequent to the electrical burning operation thereon. It will be readily apparent that the metal strip S is weakened along transverse lines with the weakening being discontinuous and in the form of short eroded areas 31. The eroded areas 31 are disposed on opposite surfaces of the strip S, although if desired, the current may be made sufficiently high so that the erosion would be completely through the strip S and the eroded areas in the form of perforations. The eroded areas 31 are separated by continuations of the coating material 18.

A modified form of apparatus is illustrated in FIGURE 9, and is generally referred to by the numeral 40. The apparatus 40 utilizes the printing apparatus 11 of the apparatus 10. However, only the rolls 12, 13 and 14 have been illustrated. The strip S is provided in coil form and is passed between the printing rolls 12 so that the large areas of coating material 18 and the narrow line areas of coating material 17 are applied to the opposite surfaces thereof.

The apparatus 40 includes a first pair of feed rolls 41 which are disposed to the right of the printing rolls 12, as viewed in FIGURE 9. Spaced to the right of the feed rolls 41 is a second set of feed rolls 42. The strip S, after being coated by the coating apparatus 11, passes between the feed rollers 41 and 42. The feed rollers 42, however, are designed to feed the coated strip S at a slightly greater rate than are the feed rollers 41, so that the coated strip S is tensioned intermediate the feed rollers 41 and 42.

A pair of electrodes 43, 44 are disposed intermediate the feed rolls 41, 42 for the purpose of heating the tensioned strip S. The electrodes 43, 44 are preferably in the form of rollers which have rolling contact with the opposite surfaces of the coated strip S.

The electrodes 43, 44, like the electrodes 21, 22, are parts of an electrical system including a transformer T having a primary winding 45 connected to a suitable power source. The transformer T also includes a secondary winding 46 which has one end thereof connected to the electrode 44 by a wire 47. The other end of the winding 46 may be connected to the electrode 43 by means of a wire 48, or the wire 48 may be connected to a control device 49, as illustrated in FIGURE 9. When the control device 49 is utilized, the control device 49 is connected to the electrode 43 by means of a wire 50.

As the narrow lines of coating material 17 pass between and engage the electrodes 43, 44, an electrical path may be completed between the electrodes 43, 44, the path passing through the coating material 17 and the base metal of the strip S. A very short impulse of high current may be thus triggered by such conduction. On the other hand, when the control device 49 is utilized, the impulse of high current is triggered by the control device 49, which control device 49 may be of any suitable detecting type, but is preferably in the form of a conventional photoelectric registration detecting means.

By controlling the flow of current into the base metal of the strip S, the base metal may be heated, and through the tensioning thereof, the base metal drawn or necked down, as at 51, to thus weaken the coated strip S. Depending upon the controlling of the current flow, there may be a slight burning or eroding of the metal, although this is not necessary and may be undesirable from the standpoint of disposing of the eroding material.

Once the metal strip S has been weakened, as shown in FIGURE 10, it may be further weakened by passing current longitudinally through the strip S in any desired manner during the continued tensioning of the strip S.

At this time, it is pointed out that the necking down of the strip S is greatly exaggerated in FIGURE 10, and the weakened area will be relatively short with a much lesser feathering of the metal of the strip S.

From the foregoing, it will be seen that novel and advantageous provision has been made for carrying out the desired end. However, attention is again directed to the fact that variations may be made in the example article, method and apparatus disclosed herein without departing from the spirit and scope of the invention, as defined in the appended claims.

I claim:

1. A continuously coated strip comprising a metal substrate having a coating on at least one surface thereof, said coating including elongated areas of coating material having electrical insulating properties, and narrow areas of coating material having electrical conductive properties, said narrow areas extending transversely of said strip at predetermined intervals and extending adjacent to but terminating short of side edges of said substrate.

2. The coated strip of claim 1 wherein the coating material of said narrow areas has a lower resistivity than said substrate.

3. A continuously coated strip comprising a metal substrate having a coating on at least one surface thereof, said coating including elongated areas of coating material having electrical insulating properties, and narrow areas of coating material having electrical conductive properties, said narrow areas extending transversely of said strip at predetermined intervals and interrupted at spaced intervals longitudinally of their lengths by extensions of said elongated areas.

4. A strip, said strip being thin and formed of metal and having a coating on both surfaces thereof, and said strip having transversely extending areas of thinner sections characterized by local electrically heated and tensioned necked down weakening lines at intervals.

5. A strip, said strip being thin and formed of metal and having a coating on at least one surface thereof, and said strip having transversely extending electrically heated and tensioned necked down weakening lines at intervals.

6. A method of transversely weakening a metal strip comprising the steps of coating closely spaced elongated areas of at least one surface of the strip with a coating having electrical insulating properties and coating the narrow areas between the elongated areas with a coating having electrical conductive properties, and passing the coated strip between a pair of opposed energized electrical contacts to effect the localized heating of the metal of the strip through the passage of electrical energy through the coated areas having electrical conductive properties and the metal of the strip.

7. A method of transversely weakening a metal strip comprising the steps of coating closely spaced elongated areas of opposite surfaces of the strip with a coating having electrical insulating properties and coating the narrow areas between the elongated areas with a coating having electrical conductive properties, and passing the coated strip between a pair of opposed energized electrical contacts to effect the localized heating of the metal of the strip through the passage of electrical energy through the coated areas having electrical conductive properties and the metal of the strip.

8. A method of transversely weakening a metal strip comprising the steps of coating closely spaced elongated areas of at least one surface of the strip with a coating having electrical insulating properties and coating the narrow areas between the elongated areas with a coating having electrical conductive properties, and passing the coated strip between a pair of opposed energized electrical contacts to effect the localized heating of the metal of the strip through the passage of electircal energy through the coated areas having electrical conductive properties and the metal of the strip simultaneous with the tensioning of said strip to effect a localized necking down of the heated metal.

9. A method of transversely weakening a metal strip comprising the steps of coating closely spaced elongated areas of at least one surface of the strip with a coating having electrical insulating properties and coating the narrow areas between the elongated areas with a coating having electrical conductive properties, and passing the coated strip between a pair of opposed energized electrical contacts to effect the localized heating and surface burning of the metal of the strip through the passage of electrical energy through the coated areas having electrical conductive properties and the metal of the strip.

10. A method of transversely weakening a metal strip comprising the steps of coating closely spaced elongated areas of at least one surface of the strip with a coating having electrical insulating properties and coating the narrow areas between the elongated areas with a coating having electrical conductive properties and projecting above the adjacent coating to facilitate an electrical connection therewith, and passing the coated strip between a pair of opposed energized electrical contacts to effect the localized heating of the metal of the strip through the passage of electrical energy through the coated areas having electrical conductive properties and the metal of the strip.

11. An apparatus for coating a metal strip and weakening the strip at predetermined intervals, said apparatus comprising means for advancing the strip, means disposed along the path of the moving strip for coating at least one surface of the strip with a coating which includes repeated large areas of electrical insulating coating material separated by transversely extending narrow areas of electrical conductive coating material, and an electrical heating system including a pair of opposed electrodes disposed in spaced relation on opposite sides of the path of the moving coated strip for engaging opposite surfaces of the coated strip.

12. The apparatus of claim 11 wherein said electrodes are in the form of rollers extending across the full width of the strip.

13. The apparatus of claim 11 wherein said electrical heating system includes means for pulsing the flow of current to said electrodes in timed relation to the movement of the narrow coating areas into alignment with said electrodes.

14. The apparatus of claim 11 wherein the electrical heating system includes a current supply sufficient to effect the erosion of the metal strip.

15. The apparatus of claim 11 together with tensioning means disposed in advance of and behind said electrodes to tension the strip while the strip is being heated to effect the localized necking down of the strip.

16. An apparatus for coating a metal strip and weakening the strip at predetermined intervals, said apparatus comprising means for advancing the strip, means disposed along the path of the moving strip for coating each face surface of the strip with a coating which includes repeated large areas of electrical insulating coating material separated by transversely extending narrow areas of electrical conductive coating material, and an electrical heating system including a pair of opposed electrodes disposed in spaced relation on opposite sides of the path of the moving coated strip for engaging opposite surfaces of the coated strip.

References Cited by the Examiner

UNITED STATES PATENTS

| | | | |
|---|---|---|---|
| 2,379,846 | 7/45 | Wilsey et al. | 117—4 |
| 2,492,214 | 12/49 | Fonda | 219—68 |
| 2,588,019 | 3/52 | Law | 117—210 |
| 2,706,231 | 4/55 | Tyler et al. | 219—68 |
| 2,886,476 | 5/59 | Dumesnil et al. | 117—212 |
| 2,966,430 | 12/60 | Schrewelius | 117—212 |
| 2,974,215 | 3/61 | Kiyoshi Inoue | 219—68 |
| 3,015,014 | 12/61 | Gartner et al. | 219—19 |

RICHARD D. NEVIUS, *Primary Examiner.*

JOESPH B. SPENCER, *Examiner.*